(12) United States Patent
Masuda et al.

(10) Patent No.: US 10,122,115 B2
(45) Date of Patent: Nov. 6, 2018

(54) CONNECTOR

(71) Applicant: YAZAKI CORPORATION, Tokyo (JP)

(72) Inventors: Satoki Masuda, Shizuoka (JP); Yuki Hiruta, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 15/711,994

(22) Filed: Sep. 21, 2017

(65) Prior Publication Data

US 2018/0090873 A1 Mar. 29, 2018

(30) Foreign Application Priority Data

Sep. 26, 2016 (JP) ................. 2016-187488

(51) Int. Cl.
*H01R 24/28* (2011.01)
*H01R 13/52* (2006.01)
*H01R 4/70* (2006.01)
*H01R 13/50* (2006.01)
*H01R 13/504* (2006.01)
*H01R 13/648* (2006.01)
*H01R 13/422* (2006.01)
*H01R 13/58* (2006.01)
(Continued)

(52) U.S. Cl.
CPC ........... *H01R 13/5202* (2013.01); *H01R 4/70* (2013.01); *H01R 13/4223* (2013.01); *H01R 13/501* (2013.01); *H01R 13/504* (2013.01); *H01R 13/5221* (2013.01); *H01R 13/5829* (2013.01); *H01R 13/648* (2013.01); *H01R 9/0518* (2013.01); *H02G 15/08* (2013.01)

(58) Field of Classification Search
CPC .... H01R 2103/00; H01R 24/28; H01R 23/02; H01R 24/20–24/24
USPC ................................... 439/694, 689
See application file for complete search history.

(56) References Cited

U.S. PATENT DOCUMENTS 6,254,436 B1 * 7/2001 Nitta .................... B60Q 1/0088
439/689
6,837,745 B2 * 1/2005 Takada ................. H01R 13/562
439/521
(Continued)

FOREIGN PATENT DOCUMENTS

JP 2005-327570 A 11/2005
JP 2011-119120 A 6/2011

OTHER PUBLICATIONS

Japanese Office Action for the related Japanese Patent Application No. 2016-187488 dated Sep. 4, 2018.

*Primary Examiner* — Gary Paumen
(74) *Attorney, Agent, or Firm* — Kenealy Vaidya LLP

(57) ABSTRACT

A connector includes an electric wire, an inner housing, an outer housing and a cover part. The electric wire includes a terminal which is provided at an end of the electric wire. The inner housing includes a terminal accommodation chamber configured to accommodate the electric wire with the terminal. The outer housing is configured to accommodate the inner housing. The inner housing has an opening which opens in a terminal fitting direction intersecting with an extending direction of the electric wire so that the electric wire and the terminal are inserted into the terminal accommodation chamber through the opening. The cover part is configured to cover a part of the opening.

10 Claims, 8 Drawing Sheets

(51) Int. Cl.
*H01R 9/05* (2006.01)
*H02G 15/08* (2006.01)

(56) References Cited

U.S. PATENT DOCUMENTS

| | | | | |
|---|---|---|---|---|
| 6,902,438 | B2 * | 6/2005 | Tsuyama | B60R 1/07 |
| | | | | 439/281 |
| 7,556,537 | B2 * | 7/2009 | Schenk | H01R 4/183 |
| | | | | 439/353 |
| 7,950,968 | B2 * | 5/2011 | Qian | H01R 9/03 |
| | | | | 439/466 |
| 8,057,261 | B1 * | 11/2011 | Desio | H01R 13/506 |
| | | | | 439/625 |
| 8,801,456 | B2 * | 8/2014 | Miyakawa | H01R 13/111 |
| | | | | 439/466 |
| 9,985,364 | B2 * | 5/2018 | Masuda | H01R 9/0518 |
| 2003/0232543 | A1 * | 12/2003 | Takada | H01R 13/562 |
| | | | | 439/694 |
| 2005/0181664 | A1 * | 8/2005 | Fukuzaki | H01R 13/42 |
| | | | | 439/521 |
| 2005/0255748 | A1 | 11/2005 | Kameyama et al. | |
| 2012/0100753 | A1 | 4/2012 | Omae et al. | |
| 2013/0164996 | A1 * | 6/2013 | Miyakawa | H01R 13/111 |
| | | | | 439/694 |
| 2016/0181751 | A1 * | 6/2016 | Affeltranger | H01R 13/514 |
| | | | | 439/638 |

\* cited by examiner

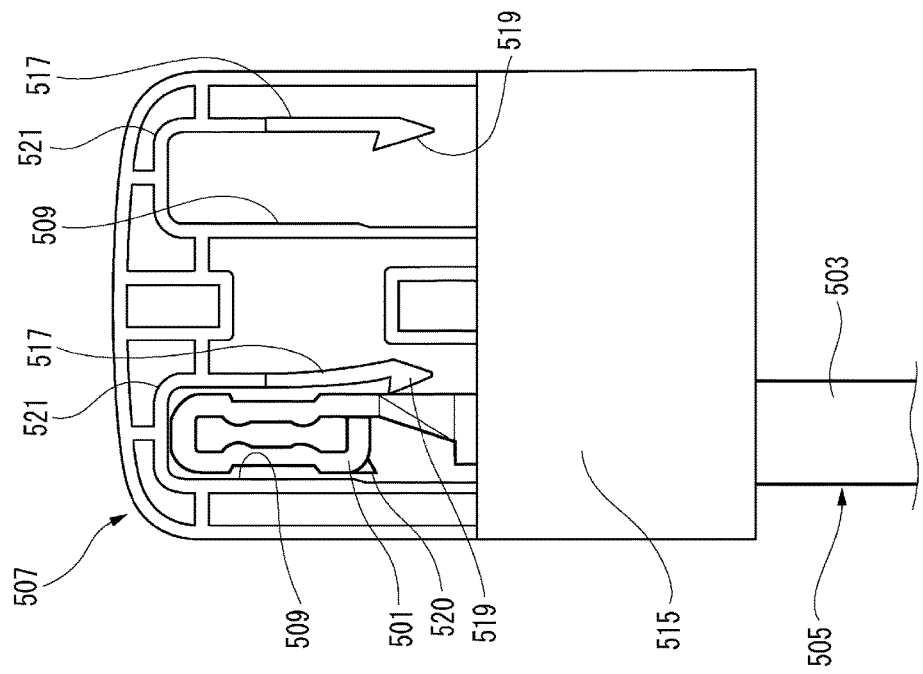
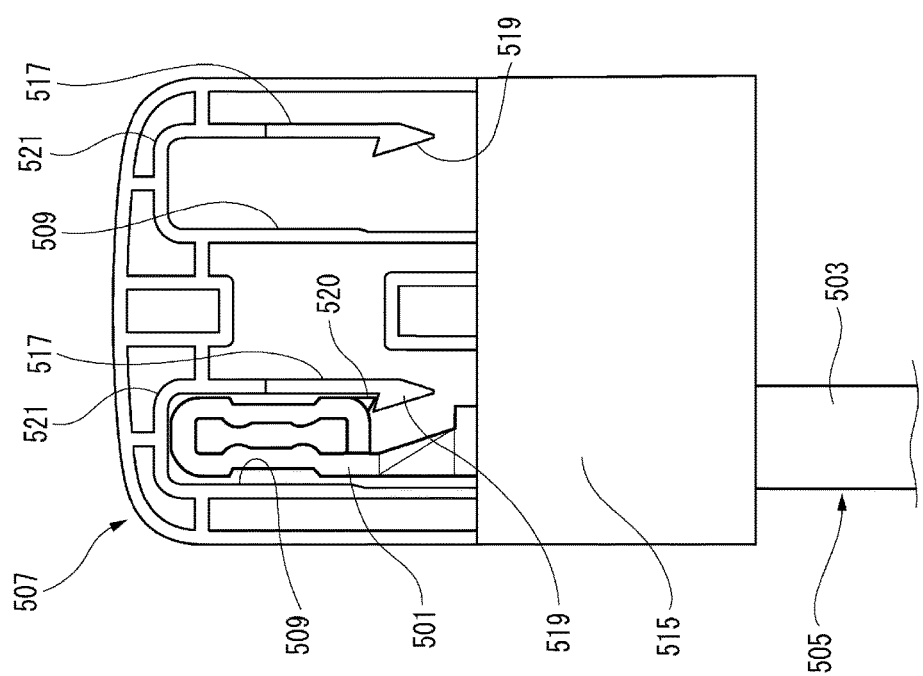

CONNECTOR

CROSS REFERENCE TO RELATED APPLICATIONS

This application is based on Japanese Patent Application (No. 2016-187488) filed on Sep. 26, 2016, the contents of which are incorporated herein by way of reference.

BACKGROUND

The present invention relates to a connector. Especially, the present invention relates to a waterproof connector.

A waterproof connector is known that includes a terminal whose fitting direction is in a direction intersecting an electric wire (see Patent Document 1 or the like). As shown in FIG. 7, a terminal 501 of this kind is attached to an end of an electric wire 503 so as to constitute an electric wire with terminal 505. Then, in general, the tip on the terminal side of the electric wire with terminal 505 is inserted in an insertion direction X' extending along the electric wire extending direction so as to be accommodated in an inner housing 507. In the electric wire with terminal 505, a fitting direction Y' with the counterpart terminal of the terminal 501 intersects (is perpendicular to, in the example shown in the figure) the insertion direction X'.

The inner housing 507 includes a pair of terminal accommodation chambers 509. Further, the inner housing 507 includes a terminal fitting opening 511 and an electric wire pullout opening 513. A portion between the terminal fitting opening 511 and the electric wire pullout opening 513 serves as an electric wire enclosing wall 515 and is integrally formed. Fitting parts of a pair of the terminals 501 are exposed through the terminal fitting opening 511. A counterpart terminal (not shown) is fit in the fitting part of each terminal 501 exposed through the terminal fitting opening 511. Through the electric wire pullout opening 513, each electric wire with terminal 505 is inserted from the terminal side so that the electric wire 503 connected to the terminal 501 is pulled out.

In the conventional art, when the terminal 501 is inserted in the inner housing 507, the insertion is performed such that a engaging protrusion 520 is latched by a terminal lock 517 serving as a flexible engaging part provided in a terminal accommodation chamber 509 shown in FIG. 8A. The terminal lock 517 is formed as a flexible piece of cantilever shape whose base end is connected to the inner housing 507 and whose tip is a free end. An engaging claw 519 is formed at the tip of the terminal lock 517. When the terminal 501 is inserted, the terminal lock 517 temporarily warps to the outer side of the terminal accommodation chamber 509 and then, when the terminal 501 has been accommodated in a predetermined position, elastically restores and locks the engaging protrusion 520 provided at the rear end of the terminal 501 so as to prevent the terminal 501 from escaping.

Then, the inner housing 507 having accommodated the terminal 501 is further accommodated in the inner side of an outer housing (not shown). The inner housing 507 is inserted in the insertion direction X' extending along the electric wire extending direction so as to be accommodated into the outer housing. Thus, the fitting part of the terminal 501 accommodated in the inner housing 507 is exposed through the housing fitting opening of the outer housing. Further, the electric wire 503 extending from the inner housing 507 is pulled out through the electric wire pullout opening of the outer housing. The space between the electric wire 503 pulled out through the electric wire pullout opening of the outer housing and the inner wall of the outer housing is waterstop-sealed by a sealing member provided in close contact with the outer periphery of the electric wire 503.

[Patent Document 1] JP 2011-119120 A

SUMMARY

An object thereof is to provide a connector in which an attachment workability of the electric wire with terminal can be ensured.

The above-mentioned object of the present invention is achieved by the following configurations (i) to (viii).

(i) A connector comprising:
an electric wire including a terminal which is provided at an end of the electric wire;
an inner housing including a terminal accommodation chamber configured to accommodate the electric wire with the terminal;
an outer housing configured to accommodate the inner housing; and
a cover part, wherein
the inner housing has an opening which opens in a terminal fitting direction intersecting with an extending direction of the electric wire so that the electric wire and the terminal are inserted into the terminal accommodation chamber through the opening, and
the cover part is configured to cover a part of the opening.

(ii) The connector according to the above (i), wherein
a shape of the terminal accommodation chamber viewed from the terminal fitting direction corresponds to an outer shape of the terminal, and
the shape of the terminal accommodation chamber is asymmetrical with respect to the extending direction of the electric wire.

(iii) The connector according to the above (ii), wherein
an engaging wall protrudes from an inner side wall defining the terminal accommodation chamber, so as to define a slit, and
the engaging wall is configured to come in contact with a corner part of the terminal at the extending direction so as to prevent the electric wire from falling out.

(iv) The connector according to the above (i), wherein
the outer housing has an electric wire pullout opening so that the inner housing is inserted through the electric wire pullout opening in the extending direction of the electric wire,
the cover part is connected to the inner housing by a hinge part, and
the hinge part extends in the extending direction.

(v) The connector according to the above (iv), further comprising:
a stepped part protruding from an inner wall of the outer housing, wherein
a protruding tip of the stepped part is configured to support the inner housing,
an end face of the stepped part at a side of the electric wire pullout opening in the extending direction is configured to come in contact with an end face of the cover part in the extending direction when the inner housing is inserted into the outer housing, and
a tip imaginary line of the end face of the stepped part is curved so that a position corresponding to an edge of the cover part opposite to the hinge part is located on a far side in an inner housing insertion direction in which the inner housing is inserted into the outer housing in the extending direction.

(vi) The connector according to the above (v), wherein
the stepped part includes a plurality of ribs extending in the inner housing insertion direction and provided in parallel to each other with intervals therebetween in an inner peripheral direction of the outer housing.
(vii) The connector according to any one of the above (i) to (vi), wherein
a protrusion configured to press the electric wire is provided in the cover part.
(viii) The connector according to any one of the above (i) to (vii), wherein
the outer housing has an electric wire pullout opening so that the inner housing is inserted through the electric wire pullout opening in the extending direction of the electric wire, and
a sealing member is provided between the electric wire pullout opening and the electric wire.

BRIEF DESCRIPTION OF DRAWINGS

FIG. 8A is a plan view of an inner housing of the conventional art in a situation that an electric wire with terminal is attached in a normal orientation. FIG. 8B is a plan view of an inner housing of the conventional art in a situation that an electric wire with terminal is attached in an opposite orientation.

DETAILED DESCRIPTION OF EXEMPLIFIED EMBODIMENT

Figure 1:
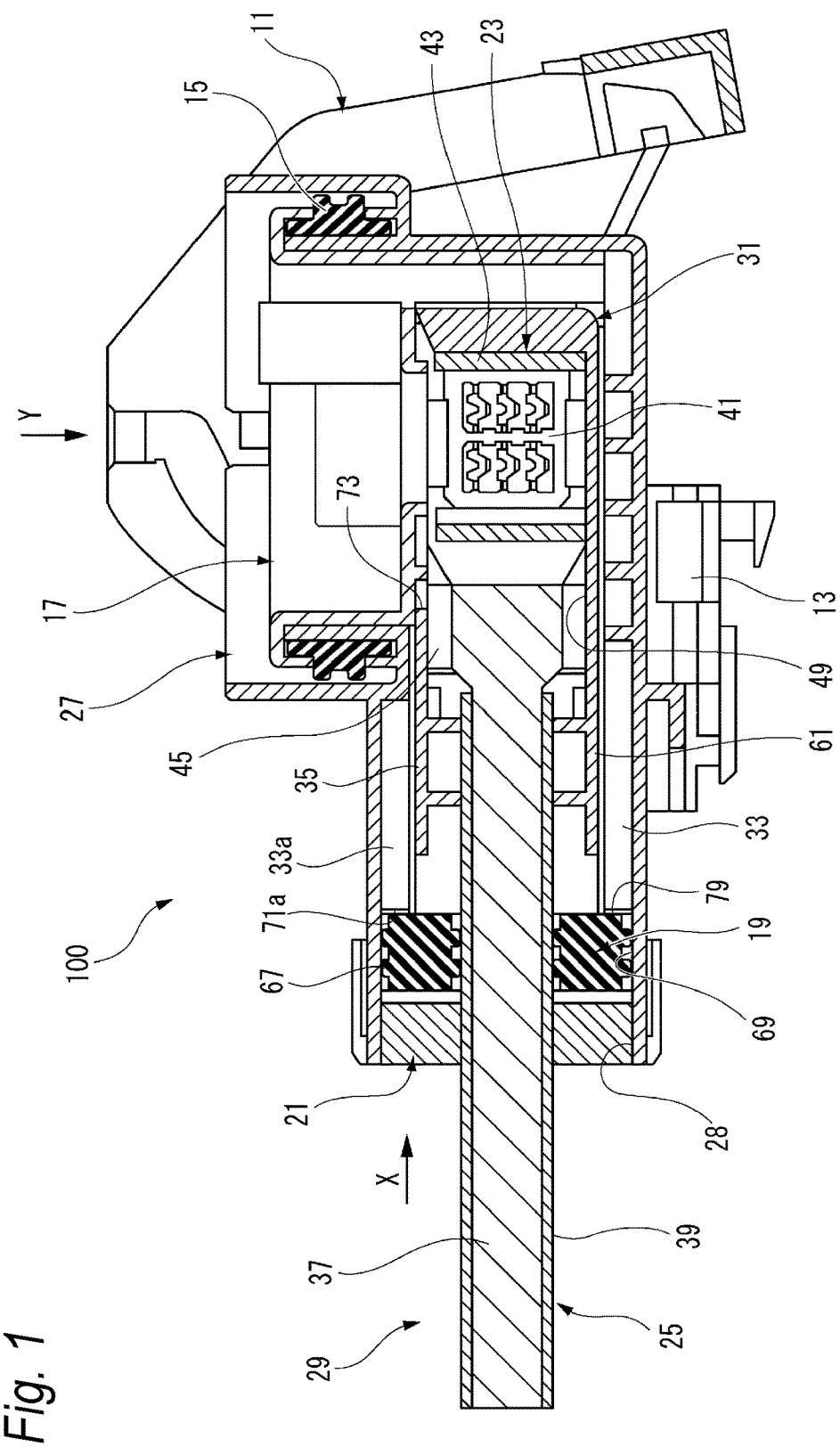
FIG. 1 is a sectional view of a waterproof connector according to an embodiment of the present invention, taken in a direction extending along the electric wire and along the terminal fitting direction.

In the case of a rectangular box-shaped female terminal, in some cases, the terminal 501 is inserted in such an orientation that the engaging protrusion 520 is not latched by the terminal lock 517 (in an orientation rotated by 180°) as shown in FIG. 8B. This situation causes a possibility of erroneous recognition as if the insertion had normally been completed. In a waterproof connector of this kind in which the inner housing 507 having accommodated the terminal 501 is accommodated in the outer housing, when such erroneous attachment is found after the completion of assembling, disassembling and reassembling need be performed also on other components and hence a large amount of time and effort is taken. Further, in the case of a terminal 501 having a rectangular box shape in which the fitting direction Y' with the counterpart terminal is in a direction intersecting the electric wire 503, a problem is caused that a box-shaped terminal holding part 521 located on the far side of the terminal accommodation chamber 509 is narrow and hence the terminal 501 attached to the tip of the electric wire with terminal 505 is difficult to be inserted.

The present invention has been devised in view of the above-mentioned situations. An object thereof is to provide a connector in which an attachment workability of the electric wire with terminal can be ensured.

Hereinafter, embodiments of the present invention are described below with reference to the drawings.

FIG. 1 is a sectional view of a waterproof connector 100 according to an embodiment of the present invention, taken in a direction extending along the electric wire and along the terminal fitting direction. In addition, the present invention can be applied to a connector which is not the waterproof connector.

The waterproof connector 100 according to the present embodiment is a lever fitting type female connector and accommodates a terminal 23 composed of a female terminal. In a basic configuration, the waterproof connector 100 of the present embodiment includes an electric wire with terminal 29, an inner housing 31, an outer housing 27, and a mat seal 19 serving as a sealing member.

Figure 2:
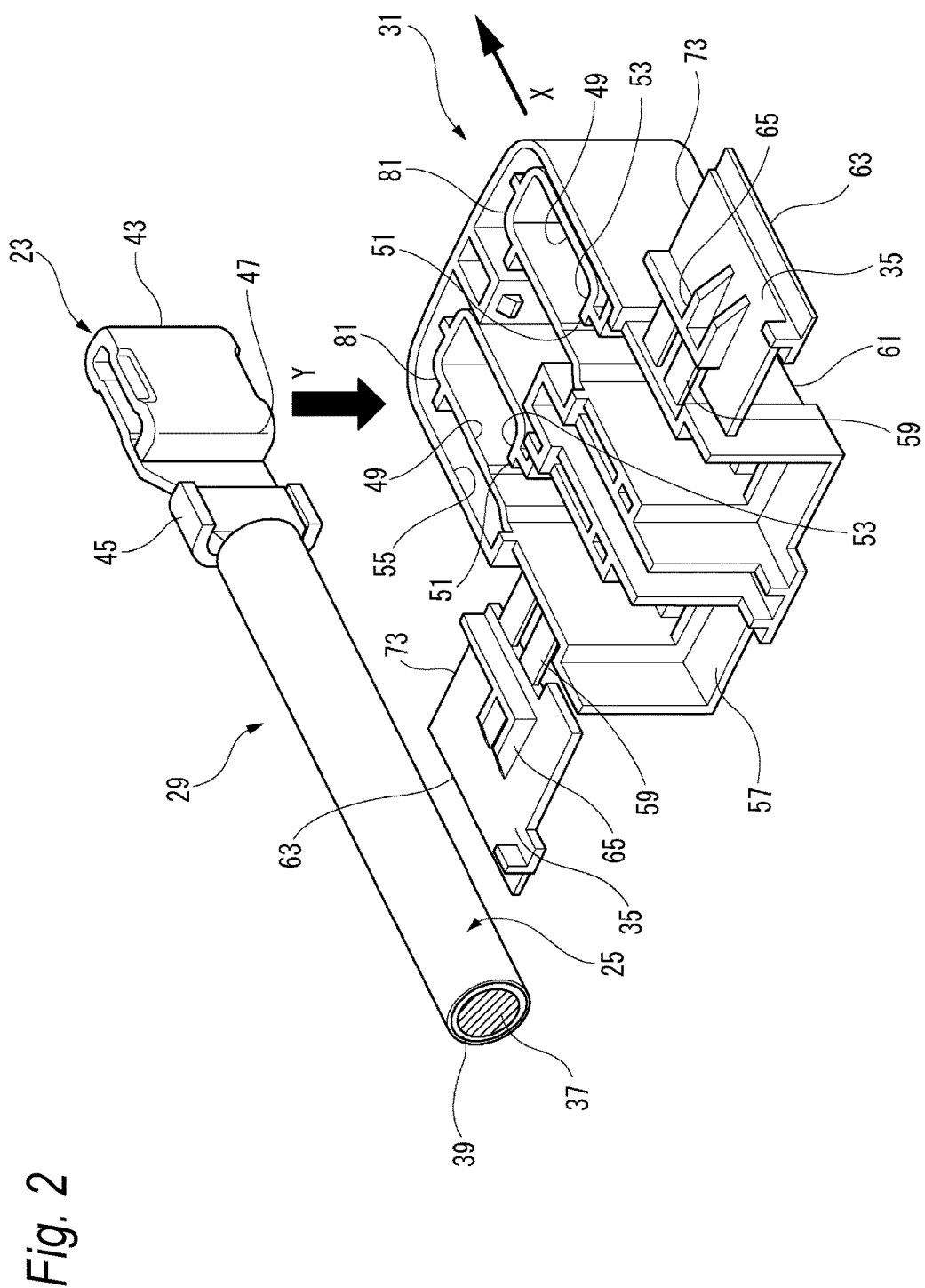
FIG. 2 is an exploded perspective view of an electric wire with terminal and an inner housing shown in FIG. 1.

As shown in FIGS. 1 and 2, in the electric wire with terminal 29, the terminal 23 is attached to an end of an electric wire 25. In the electric wire 25, a core wire 37 in the center is covered by an external sheath 39 having an insulating property. The terminal 23 is formed in a rectangular box shape by using a sheet metal. The terminal 23 has a shape which may be asymmetrical with respect to an axis of the electric wire 25.

In the electric wire with terminal 29, a direction intersecting the extending direction of the electric wire 25 serves as the fitting direction of the terminal 23 (an arrow-Y direction). In the terminal 23, one side face of the box shape is open. In the terminal 23, the opening serves as the fitting part of a counterpart terminal (not shown). That is, the terminal 23 is formed as a female terminal. Here, the terminal in the present invention may be a male terminal. The terminal 23 includes a terminal spring 41 provided in the inside so as to improve the conductivity with the counterpart terminal (see FIG. 1). Here, in the present invention, the terminal of the electric wire with terminal may be not the terminal 23 whose the fitting direction is in a direction intersecting the electric wire 25 and may be a terminal whose fitting direction is in the electric wire extending direction.

In the present embodiment, in the terminal 23, a conductor connection part 45 is provided continuously to a terminal body 43 having a rectangular box shape. A corner part 47 of the rectangular box shape of the terminal body 43 is locked by a engaging wall 53 of a later-described terminal accommodation chamber 49 formed in the inner housing 31.

As shown in FIGS. 1 and 2, the inner housing 31 is constructed from an insulating resin material having a rectangular box shape. The inner housing 31 is inserted into the inner side of a tubular part 27a of the outer housing 27 in the inner housing insertion direction extending along the electric wire extending direction (an arrow-X direction). In the present embodiment, the inner housing 31 includes a pair of terminal accommodation chambers 49. That is, the inner housing 31 accommodates the terminal side of a pair of the electric wires with terminal 29. In addition, the number of the terminal accommodation chamber 49 may be one or more than two.

Each terminal accommodation chamber 49 is formed in a rectangular tube shape for accommodating the terminal body 43 almost without a gap. A part of the terminal accommodation chamber 49 at the electric wire pullout side is formed as a slit 51 and hence is open at a position decentering from the axis of the electric wire 25. The conductor connection part 45 of the terminal body 43 accommodated in the terminal accommodation chamber 49 is inserted into the slit 51. In the terminal accommodation chamber 49, in the inner wall where the slit 51 is formed, the portion where the slit 51 is not formed remains as the engaging wall 53. The engaging wall 53 comes in contact with the above-mentioned corner part 47 of the terminal body 43. By virtue of this, the corner part 47 is latched by the engaging wall 53 so that falling out of the terminal body 43 to the electric wire pullout side is restricted. That is, the electric wire with terminal 29 is prevented from falling out. In other words, the engaging wall 53 protrudes from an inner side wall defining the terminal accommodation chamber 49, so as to define the slit 51, and the engaging wall 53 is configured to come in contact with the corner part 47 of the terminal 53 at the extending direction X so as to prevent the electric wire 25 from falling out.

Figure 6:
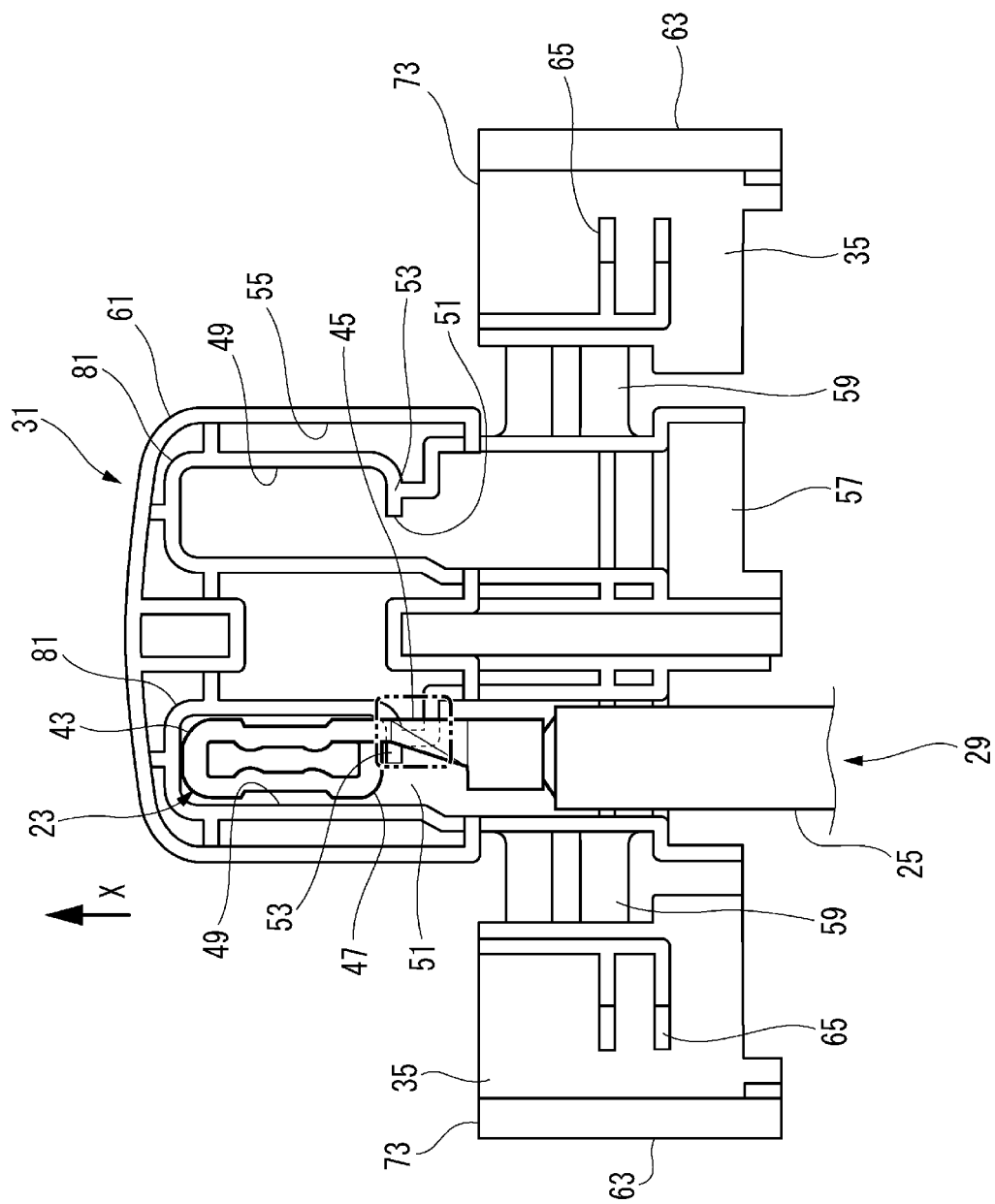
FIG. 6 is a plan view of an inner housing used for describing a situation that an electric wire with terminal is inserted in an opposite orientation.

In the terminal accommodation chamber 49, the slit 51 and the engaging wall 53 are arranged asymmetrically to each other on one side and the other side of the axis of the electric wire 25. In other words, a shape of the terminal accommodation chamber 49 viewed from the terminal fitting direction Y corresponds to an outer shape of the terminal 23, and the shape of the terminal accommodation chamber 49 is asymmetrical with respect to the extending direction X of the electric wire 25. Thus, when the electric wire with terminal 29 is inserted into the terminal accommodation chamber 49 in an opposite orientation (an orientation rotated by 180°), the conductor connection part 45 abuts against the engaging wall 53 (see FIG. 6). As a result, in the electric wire with terminal 29, the terminal 23 cannot be inserted into the terminal accommodation chamber 49. As such, the waterproof connector 100 is constructed such that erroneous insertion of the electric wire with terminal 29 into the inner housing 31 in an erroneous orientation is prevented in advance.

The inner housing 31 includes a terminal fitting opening 55 and an electric wire pullout opening 57 both in fluid communication with the terminal accommodation chamber 49. In the inner housing 31, a pair of cover parts 35 are formed between the terminal fitting opening 55 and the electric wire pullout opening 57. Each cover part 35 is connected to the inner housing body 61 through a hinge part 59. The hinge part 59 extends along the inner housing insertion direction X. In the pair of cover parts 35, a pair of overlapping parts 63 located on the opposite side to each hinge part 59 extend along the inner housing insertion direction X. That is, the pair of cover parts 35 are constructed in the form of a double door. By virtue of this, the cover part 35 can cause the terminal accommodation chamber 49 to be open.

A protrusion 65 protrudes from a face of the cover part 35 opposing the electric wire 25. When the cover part 35 is closed, the protrusion 65 abuts against the electric wire 25. That is, the electric wire 25 of the electric wire with terminal 29 is reliably held when the cover part 35 is closed.

For example, the cover parts 35 may be in the form of a single door. In this case, in the cover part 35, the opposite edge to the hinge part 59 serves as an overlapping part 63 to be overlapped with the overlapping part 63 in the upper edge of the inner housing body 61.

Further, the overlapping part 63 of the cover part 35 is not fixed by a locking structure or by welding. By virtue of this, the inner housing 31 is compact and can be fabricated easily. This realizes size reduction of the inner housing 31 and reduction in the component cost.

The tubular part 27a of the outer housing 27 includes an electric wire pullout opening 28 for accepting the inner housing 31 from which the electric wire 25 is pulled out, in the inner housing insertion direction extending along the electric wire extending direction X. The electric wire 25 is pulled out through the electric wire pullout opening 28 of the outer housing 27 having accommodated the inner housing 31.

An inner peripheral sealing surface 69 brought into close contact with a seal outer peripheral surface 67 (see FIG. 1) of a mat seal 19 attached to the outer periphery of the electric wire 25 is formed in the electric wire pullout opening 28 of the outer housing 27.

The mat seal 19 is fabricated from an elastic material such as rubber. Then, the inner periphery is in close contact with the outer periphery of the electric wire 25 and the seal outer peripheral surface 67 is in close contact with the inner peripheral sealing surface 69 of the outer housing 27. By virtue of this, the mat seal 19 performs waterstop sealing between the electric wire 25 and the tubular part 27a of the outer housing 27 so as to ensure water-tightness.

A plurality of ribs 33 that protrude from the inner wall so as to constitute a stepped part whose protruding tips 66 support the inner housing 31 are provided in the inner wall of the tubular part 27a of the outer housing 27. The plurality of ribs 33 are formed on the far side in the inner housing insertion direction X relative to the above-mentioned inner peripheral sealing surface 69.

The stepped part in the present embodiment is constructed as the plurality of ribs 33 extending in the inner housing insertion direction X and provided in parallel to each other with intervals in between in the inner peripheral direction of the tubular part 27a of the outer housing 27. In each rib 33, the protruding tip 66 toward the housing inner side supports the inner housing 31. Further, the rib 33 is formed such that the cross section perpendicular to the extending direction has a rectangular shape. In the present embodiment, all ribs 33 have the same cross sectional shapes. Here, the ribs 33 having different cross sectional shapes from each other may be mixed and employed. Further, for example, when the inner peripheral sealing surface 69 is formed in the thin-wall part of the tubular part 27a of the outer housing 27, the stepped part of the present invention may be formed as the thick-wall part of the tubular part 27a formed on the far side in the inner housing insertion direction X relative to the inner peripheral sealing surface 69. In this case, in the stepped part, the inner peripheral surface of the tubular part 27a forms a continuous inner surface (a tube inner surface).

Figure 3A:
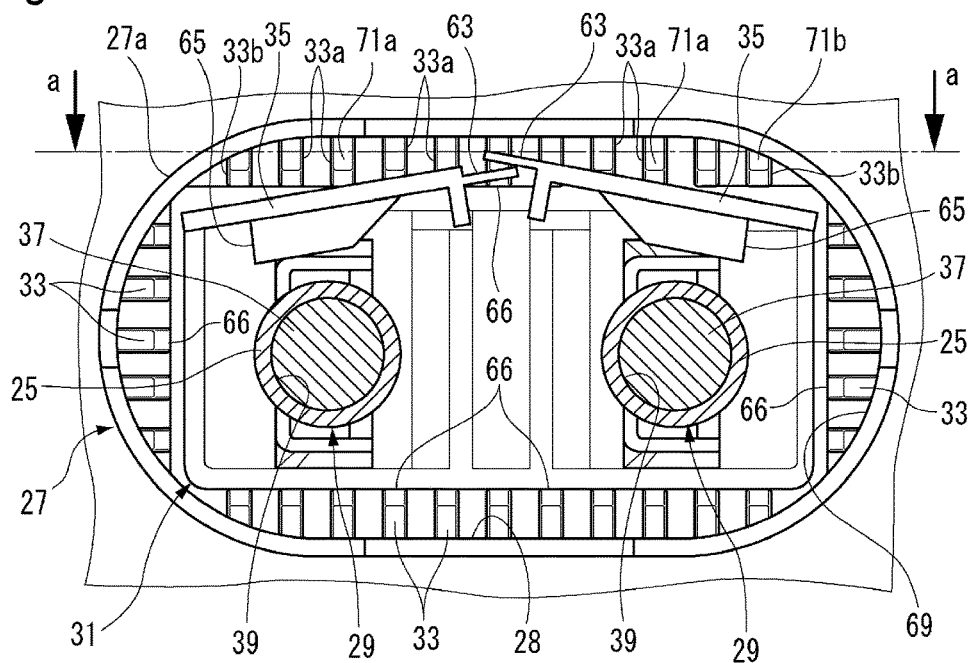
FIG. 3A is a rear view of an outer housing in a situation prior to insertion of an inner housing into a stepped part.
Figure 3B:
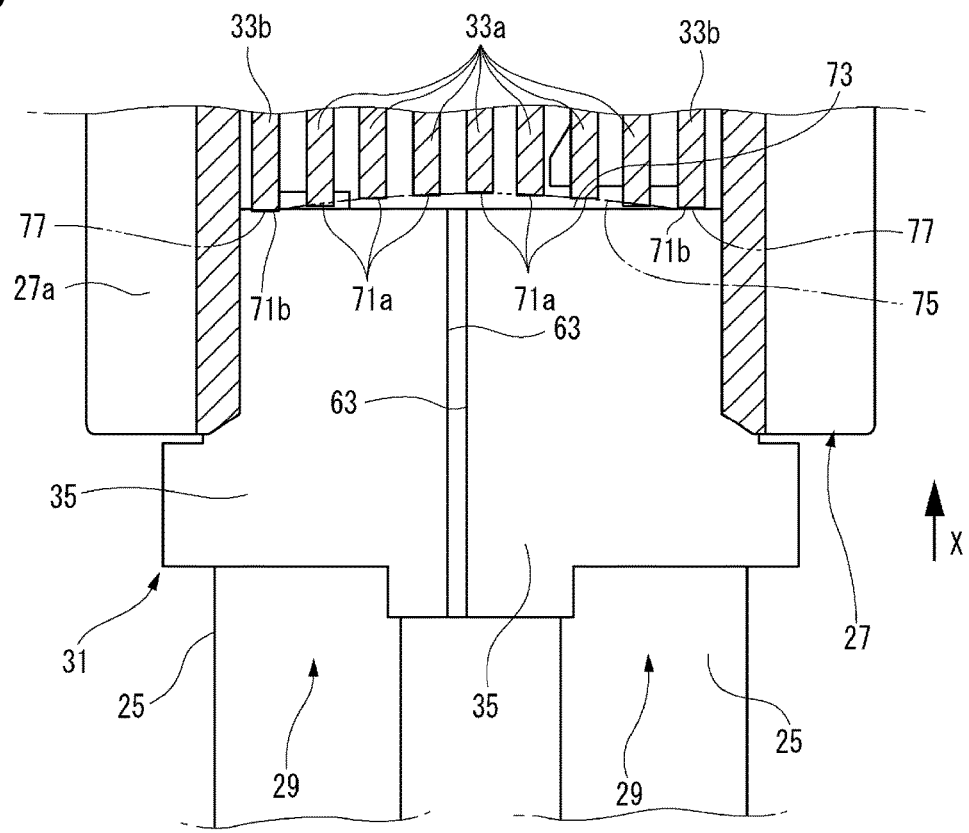
FIG. 3B is a sectional view taken along line a-a in FIG. 3A.

FIG. 3A is a rear view of the outer housing 27 in a situation prior to the insertion of the inner housing 31. FIG. 3B is a sectional view taken along line a-a in FIG. 3A.

In the present embodiment, among the plurality of ribs 33 provided in parallel to each other with intervals in between in the inner peripheral direction of the inner peripheral surface of the tubular part 27a, a plurality of the ribs 33a formed at a position (the upper inner surface in FIG. 3A) corresponding to the cover part 35 of the inner housing 31 have an electric wire pullout-side end face 71a in which each end on the inner peripheral sealing surface 69 side (the electric wire pullout-side end on the lower middle side in FIG. 3A) gradually departs from the opening end of the tubular part 27a as going toward the center.

That is, as shown in FIG. 3B, a tip imaginary line 75 passing the electric wire pullout-side end faces 71a of the ribs 33a is curved such that the position corresponding to the overlapping part 63 of the cover part 35 is located on the far side in the inner housing insertion direction X. Then, when the inner housing 31 is inserted, the electric wire pullout-side end faces 71a of the ribs 33a abut stepwise against the insertion tip end 73 of the cover part 35. When abutting stepwise against the electric wire pullout-side end faces 71a of the corresponding ribs 33a, the cover part 35 is biased in the closing direction.

In the present embodiment, chamfering is performed on the insertion start ends (the electric wire pullout-side ends) of the ribs 33 including the ribs 33a in the inner housing insertion direction X so that the inner housing 31 is easily inserted into the tubular part 27a of the outer housing 27. That is, the ribs 33a can easily handle (easily press down in the closing direction) the floating cover part 35.

Thus, in the inner housing 31, the fabrication tolerance in the double door of the cover part 35 may be in a tendency to open. As a result, the processing management can be easy and the process cost can be inexpensive. Further, undesired catching at the time of insertion of the inner housing 31 can be prevented so that the assembling workability can be improved.

Further, ribs 33b in which the electric wire pullout-side end faces 71b passed by a straight tip imaginary line 77 are provided at the electric wire pullout-side end are formed on both sides of the ribs 33a having the electric wire pullout-side end faces 71a passed by the tip imaginary line 75 (see FIG. 3B). An insertion-directional seal end 79 (see FIG. 1) of the mat seal 19 abuts against the electric wire pullout-side end faces 71b.

Further, the waterproof connector 100 of the present embodiment includes a lever 11, a fitting position ensuring lock 13 (CPA: Connector Position Assurance), a connector packing 15, a front holder 17, a mat seal 19, and a rear holder 21.

The lever 11 realizes fitting between the waterproof connector 100 and a counterpart connector (not shown) by using a low inserting force by virtue of leverage. The fitting position ensuring lock 13 has a half-fitting preventing function. In a state that the waterproof connector 100 and the counterpart connector are fit in together, this function is used for preventing a situation that the lock is released on any occasion. For example, such a construction is employed that the lock is covered so that its return is prevented. The connector packing 15 serves as a sealing member for ensuring the water-tightness with the counterpart connector at the time of connector fitting.

the front holder 17 is attached to the housing fitting opening of the outer housing 27 and thereby covers the periphery of the fitting part of the terminal 23 accommodated in the waterproof connector 100 so as to hold the connector packing 15. The rear holder 21 is attached to the electric wire pullout opening 28 of the outer housing 27 so as to restrict the falling out of the mat seal 19.

As shown in FIGS. 3A and 3B, in the waterproof connector 100, at the time of insertion of the inner housing 31, in some cases, the pair of cover parts 35 are somewhat open (the overlapping parts 63 are floating outward). In such cases, once insertion of the inner housing 31 is started, first, the electric wire pullout-side end faces 71a of the ribs 33a on both sides located on the tip imaginary line 75 abuts against the insertion tip end 73 of the cover part 35. When the inner housing 31 is inserted further, the cover part 35 receives a reaction force from the electric wire pullout-side end faces 71a so as to be biased in the closing direction. By virtue of this, the original flotation of the cover part 35 is reduced.

Figure 4A:
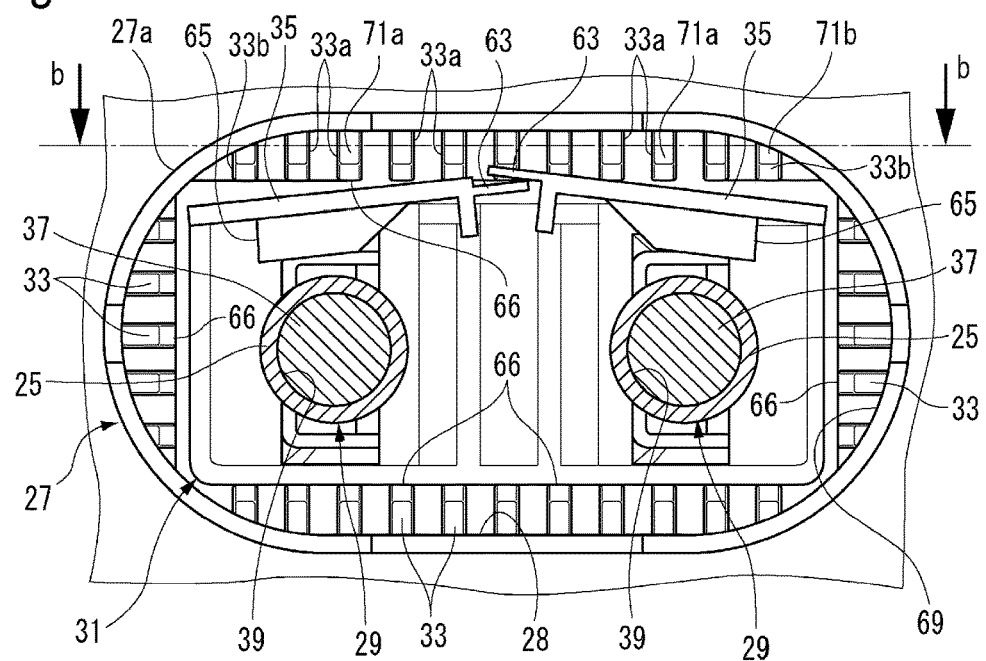
FIG. 4A is a rear view of an outer housing in the course of insertion of an inner housing into a stepped part.
Figure 4B:
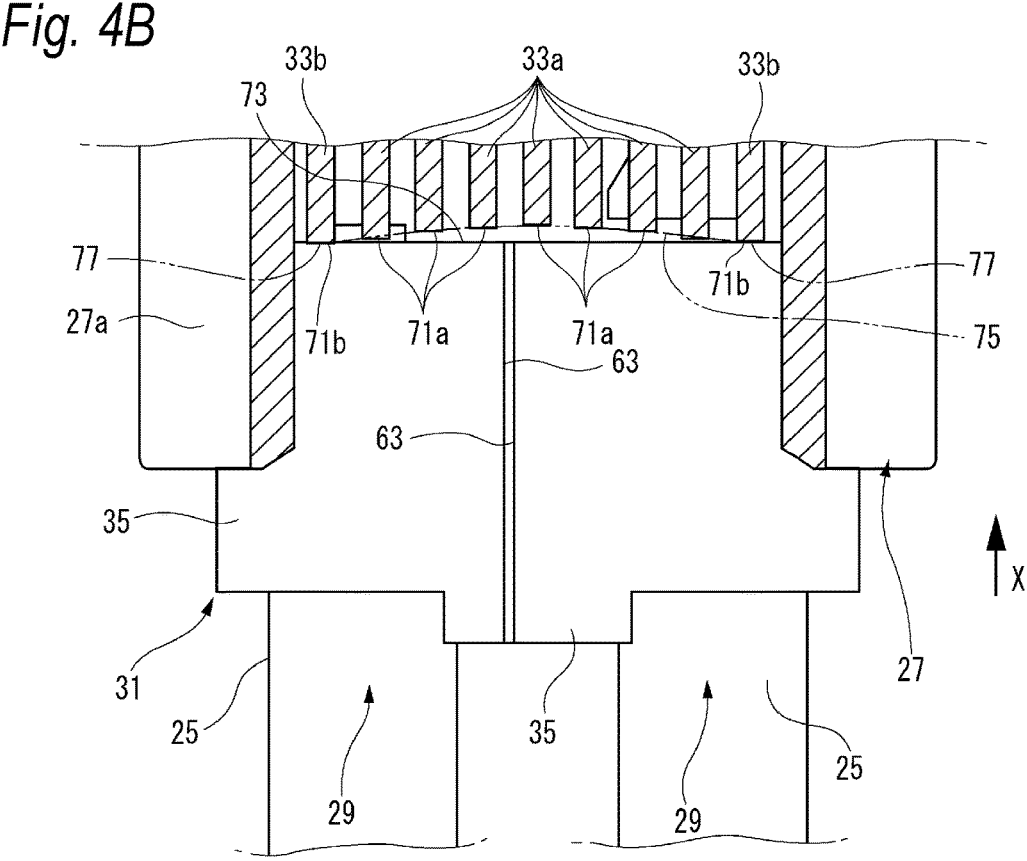
FIG. 4B is a sectional view taken along line b-b in FIG. 4A.

As shown in FIGS. 4A and 4B, in the course of insertion of the inner housing 31, the insertion tip end 73 of the cover part 35 floating smaller than the original flotation amount abuts against the electric wire pullout-side end faces 71a of the ribs 33a on the center side relative to the ribs 33a on both sides on the tip imaginary line 75. When the inner housing 31 is inserted further, the cover part 35 receives a reaction force from the electric wire pullout-side end faces 71a on the center side so as to be biased further in the closing direction. By virtue of this, the flotation amount of the cover part 35 is reduced further.

Figure 5A:
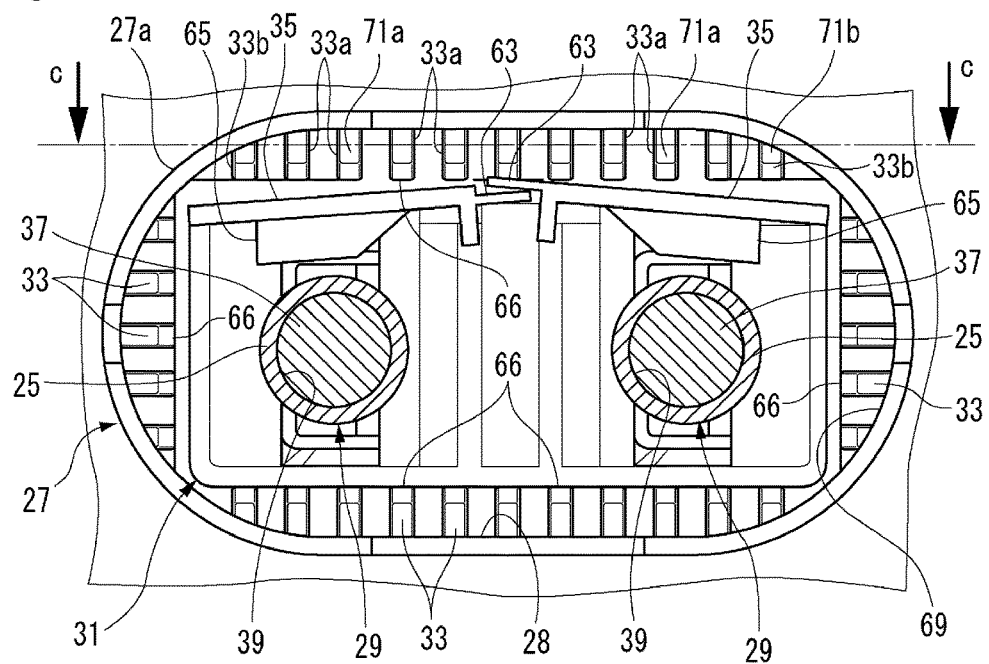
FIG. 5A is a rear view of an outer housing in a situation that insertion of an inner housing into a stepped part has been completed.
Figure 5B:
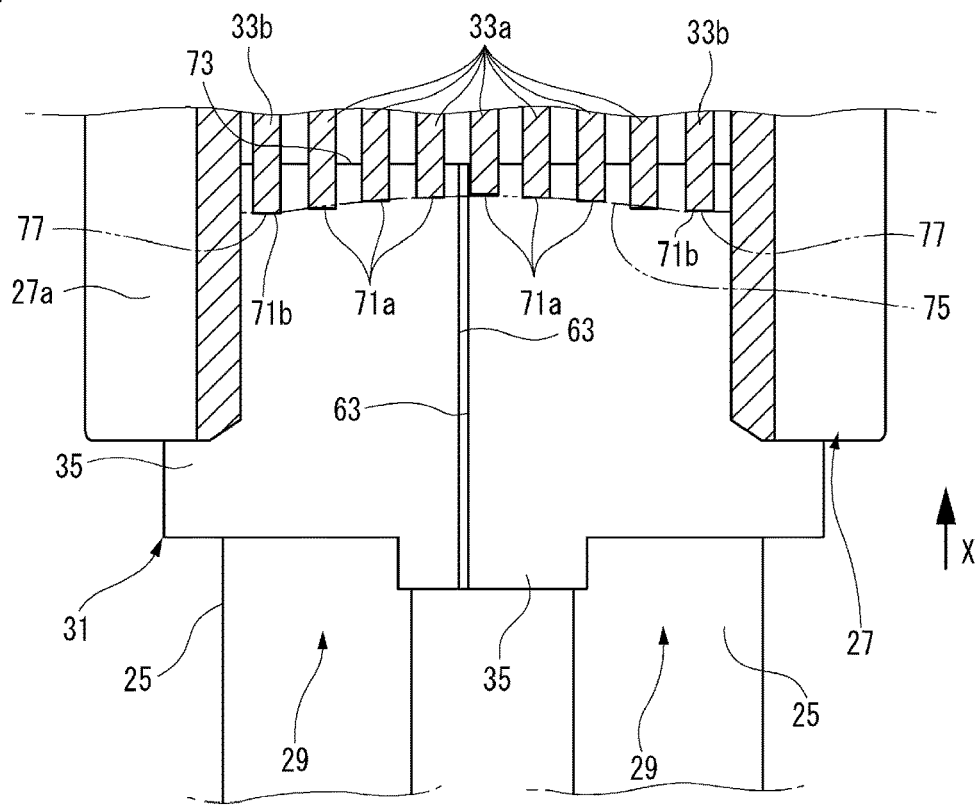
FIG. 5B is a sectional view taken along line c-c in FIG. 5A.

As shown in FIGS. 5A and 5B, on completion of the insertion of the inner housing 31 into a region where the ribs 33 are protruding in the inner peripheral surface of the tubular part 27a, the insertion tip end 73 of the cover part 35 abuts against the electric wire pullout-side end face 71a of the center rib 33a on the tip imaginary line 75. Thus, the overlapping part 63 of the cover part 35 is pressed by the electric wire pullout-side end face 71a of the center rib 33a so that the cover part 35 is closed and then, in this state, the inner housing 31 is inserted into the regular position of the outer housing 27.

As such, in the waterproof connector 100, the positions (the positions along the inner housing insertion direction X) of the electric wire pullout-side end faces 71a of the plurality of ribs 33a provided in the outer housing 27 vary with each other such as to abut stepwise against the insertion tip end 73 of the cover part 35 in association with the progress of attachment of the inner housing 31.

Next, description is given for the operation of the configuration described above.

Figure 7:
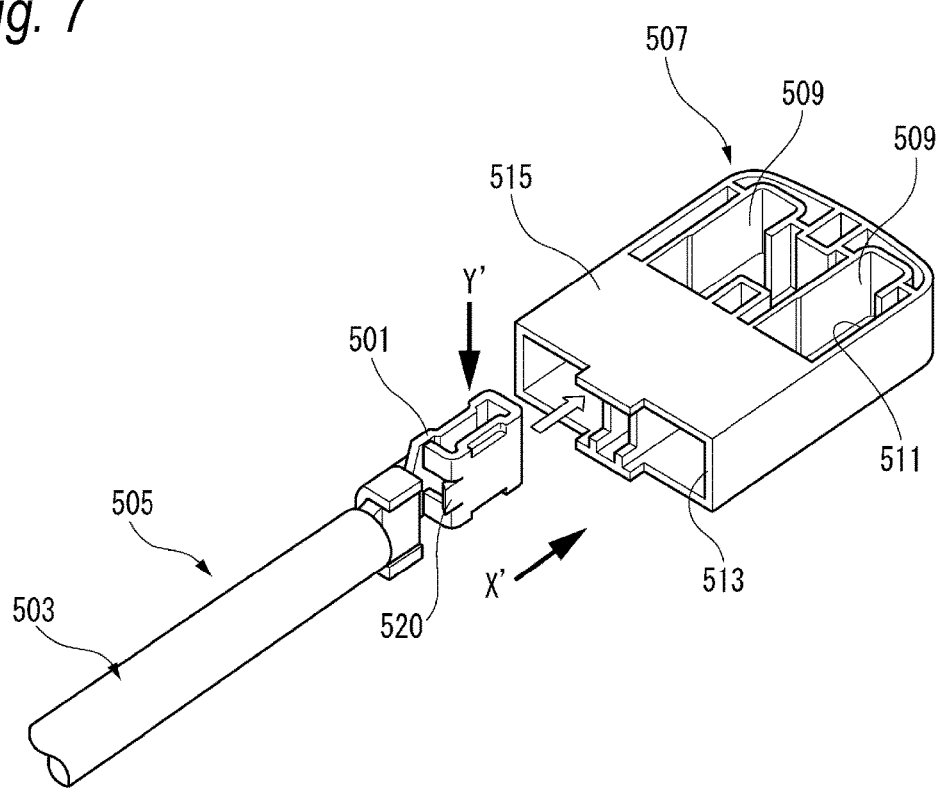
FIG. 7 is an exploded perspective view showing an inner housing of the conventional art together with an electric wire with terminal.

In the waterproof connector 100 according to the present embodiment, the cover part 35 is formed between the terminal fitting opening 55 and the electric wire pullout opening 57 of the inner housing 31. In the conventional art, the portion corresponding to the cover part 35 has been molded integrally with the inner housing 507 such as to serve as the electric wire enclosing wall 515 for covering the terminal accommodation chamber 509 (see FIG. 7).

In contrast, the cover part 35 is integrally molded with the hinge part 59 in between. In the inner housing whose cover part 35 has been opened so that the inner housing 31 has been opened, the terminal fitting opening 55 and the electric wire pullout opening 57 go into fluid communication with each other and the entire face of the terminal accommodation chamber 49 in the fitting direction Y is widely opened. By virtue of this, the electric wire with terminal 29 can be parallel-displaced in the fitting direction Y with the counterpart terminal so as to be inserted into the terminal accommodation chamber 49.

As a result, insertion of the terminal 23 into the narrow terminal holding part 81 which is located on the far side in the terminal insertion direction and hence insertion into which has been difficult in the conventional art can be performed from a proximity position in the fitting direction Y. Thus, in the electric wire with terminal 29, the work of insertion of the terminal 23 attached to the tip into the terminal accommodation chamber 49 becomes remarkably satisfactory.

In the waterproof connector 100 of the present embodiment, the insertion direction of the electric wire with terminal 29 into the inner housing 31 has been changed to the fitting direction Y. By virtue of this, the orientation of insertion is recognized at a glance. Further, as shown in FIG.

6, such a structure is realized that even when the orientation of insertion of the terminal 23 is wrong, the corner part 47 of the terminal body 43 interferes with the engaging wall 53 of the terminal accommodation chamber 49 so that the opposite attachment is not achievable. Thus, erroneous attachment of the terminal 23 can be prevented in advance and hence the workability of insertion of the electric wire with terminal 29 into the inner housing 31 can be improved in comparison with the conventional structure.

Further, in the waterproof connector 100 according to the present embodiment, even when variation is present in the amount of bending of the cover part 35, the insertion workability of the inner housing 31 into the outer housing 27 is hardly degraded.

That is, as shown in FIGS. 3A and 3B, when the amounts of bending is insufficient, the overlapping parts 63 of the pair of cover parts 35 float and open in an inverted V-shape. In this state, when the inner housing 31 having accommodated the electric wire with terminal 29 is inserted into the outer housing 27, first, the base end side in which the vicinity of the hinge part 59 in the cover part 35 has a smaller opening amount (flotation amount) abuts against the rib 33a on the hinge part 59 side.

When the inner housing 31 is inserted further into the outer housing 27, the insertion tip end 73 receives a reaction force (a biasing force) from the electric wire pullout-side end face 71a of the rib 33 so that the cover part 35 is bent in the closing direction. By virtue of this, the overlapping part 63 is pressed.

The positions of the individual electric wire pullout-side end faces 71a of the plurality of ribs 33a gradually go to the far side as going toward the overlapping part 63. Thus, at each step of insertion of the inner housing 31 into the tubular part 27a, the cover part 35 abuts stepwise against the ribs 33a arranged on the next far side.

Thus, the cover part 35 is bent stepwise so that, as shown in FIGS. 5A and 5B, the insertion tip end 73 of the overlapping part 63 is finally bent by the electric wire pullout-side end face 71a of the center rib 33a. By virtue of this, a bending position is realized that the overlapping part 63 does not interfere with the electric wire pullout-side end faces 71a of the ribs 33a and hence the attachment workability is not degraded. As a result, even the insertion tip end 73 of the overlapping part 63 having a large opening amount is not directly caught by the ribs 33a. Thus, the inner housing 31 can smoothly be inserted into the tubular part 27a of the outer housing 27.

Further, in the waterproof connector 100 of the present embodiment, once the inner housing 31 is inserted into the outer housing 27, the cover part 35 is moved in the closing direction by a reaction force received from the electric wire pullout-side end face 71a of the rib 33a. The protrusion 65 provided in the electric wire opposing face of the cover part 35 goes into abutment against the electric wire 25 in association with the movement of the cover part 35 in the closing direction. The cover part 35 is moved in the closing direction by the electric wire pullout-side end face 71a and then finally pressed by the protruding tip 66 of the rib 33a so as to be closed. At that time, in the cover part 35, the reaction force received from the rib 33a becomes maximal. The electric wire 25 is pressed by the reaction force received from the protrusion 65 so as to be held reliably within the inner housing 31.

Further, in the waterproof connector 100, in comparison with a case that the stepped part is formed as a thick-wall part, since gaps are formed between the ribs 33, the outer housing 27 has a smaller contact area with the inner housing 31 at the time of insertion of the inner housing 31. By virtue of this, the insertion resistance can be suppressed and hence the insertion workability of the inner housing 31 can be improved further. Moreover, the amount of resin material used in the molding of the outer housing 27 can be reduced and hence weight reduction is achieved.

Further, in the waterproof connector 100 of the present embodiment, when the height values of the ribs 33a or the curvature of the tip imaginary line 75 passing the plurality of electric wire pullout-side end faces 71a is merely changed, the attachment workability of the inner housing 31 and the waterproofness of the mat seal 19 can be ensured. Further, even when the opening condition of the overlapping part 63 varies owing to the shape of the mat seal 19 or the specification of the inner housing 31, the variation can be treated by merely changing the ribs 33a. Thus, high universality is obtained.

Further, in the waterproof connector 100, waterstop-sealing is achieved by the mat seal 19 in a portion between the electric wire 25 pulled out from the outer housing 27 and the inner peripheral sealing surface 69 in the electric wire pullout opening 28 of the outer housing 27. At that time, the insertion-directional seal end 79 of the mat seal 19 cannot go into contact with the electric wire pullout-side end faces 71a on the far side formed in the ribs 33a whose tip imaginary line 75 is curved. However, the insertion-directional seal end 79 can abut against the electric wire pullout-side end faces 71b of the ribs 33b whose tip imaginary line 77 is straight. By virtue of this, in the mat seal 19, positioning and pressing can reliably be achieved in the inner housing insertion direction X and hence the waterstop performance is not degraded.

Thus, according to the waterproof connector 100 of the present embodiment, the attachment workability of the electric wire with terminal 29 can be ensured.

Here, the present invention is not limited to the embodiments given above. That is, suitable modifications, improvements, or the like may be made. In addition, the construction material, the shape, the dimensions, the number, the arrangement location, and the like of each component employed in the embodiments given above are arbitrary and not limited to particular ones as long as the present invention can be implemented.

Here, the features of the embodiments of the waterproof connector according to the present invention given above are briefly listed below as (i) to (viii).

(i) A connector (100) including:
an electric wire (25) including a terminal (23) which is provided at an end of the electric wire (25);
an inner housing (31) including a terminal accommodation chamber (49) configured to accommodate the electric wire (25) with the terminal (23);
an outer housing (27) configured to accommodate the inner housing (31); and
a cover part (35), wherein
the inner housing (31) has an opening (55) which opens in a terminal fitting direction (Y) intersecting with an extending direction (X) of the electric wire (25) so that the electric wire (25) and the terminal (23) are inserted into the terminal accommodation chamber (49) through the opening (55), and
the cover part (35) is configured to cover a part of the opening (55).

(ii) The connector (100) according to the above (i), wherein
a shape of the terminal accommodation chamber (49) viewed from the terminal fitting direction (Y) corresponds to an outer shape of the terminal (23), and the shape of the terminal accommodation chamber (49) is asymmetrical with respect to the extending direction (X) of the electric wire (25).

(iii) The connector (100) according to the above (ii), wherein an engaging wall (53) protrudes from an inner side wall defining the terminal accommodation chamber (49), so as to define a slit (51), and the engaging wall (53) is configured to come in contact with a corner part (47) of the terminal (53) at the extending direction (X) so as to prevent the electric wire (25) from falling out.

(iv) The connector (100) according to the above (i), wherein the outer housing (27) has an electric wire pullout opening (57) so that the inner housing (31) is inserted through the electric wire pullout opening (57) in the extending direction (X) of the electric wire (25), the cover part (35) is connected to the inner housing (31) by a hinge part (59), and the hinge part (59) extends in the extending direction (X).

(v) The connector (100) according to the above (iv), further comprising:

a stepped part (33, 33a, 33b) protruding from an inner wall of the outer housing (27), wherein a protruding tip (66) of the stepped part (33) is configured to support the inner housing (31), an end face (71a) of the stepped part (33a) at a side of the electric wire pullout opening (57) in the extending direction (X) is configured to come in contact with an end face (73) of the cover part (35) in the extending direction (X) when the inner housing (31) is inserted into the outer housing (27), and a tip imaginary line (75) of the end face (71a) of the stepped part (33a) is curved so that a position corresponding to an edge (63) of the cover part (35) opposite to the hinge part (59) is located on a far side in an inner housing insertion direction in which the inner housing (31) is inserted into the outer housing (27) in the extending direction (X).

(vi) The connector (100) according to the above (v), wherein the stepped part includes a plurality of ribs (33, 33a, 33b) extending in the inner housing insertion direction and provided in parallel to each other with intervals therebetween in an inner peripheral direction of the outer housing (27).

(vii) The connector (100) according to any one of the above (i) to (vi), wherein a protrusion configured to press the electric wire is provided in the cover part.

(viii) The connector (100) according to any one of the above (i) to (vii), wherein the outer housing (27) has an electric wire pullout opening (57) so that the inner housing (31) is inserted through the electric wire pullout opening (57) in the extending direction (X) of the electric wire (25), and a sealing member (19) is provided between the electric wire pullout opening (57) and the electric wire (25).

According to the connector of the invention, the cover part capable of causing the terminal accommodation chamber to be open is formed in the inner housing. The cover part is integrally molded with the hinge part in between. In the inner housing whose cover part has been opened so that the inner housing has been opened, one entire face of the terminal accommodation chamber is widely opened. By virtue of this, the electric wire with terminal can be parallel-displaced in a direction intersecting the electric wire so as to be inserted into the terminal accommodation chamber. As a result, insertion into the narrow terminal holding part which is located on the far side in the inner housing insertion direction and hence insertion into which has been difficult in the conventional art can be performed from a proximity position in a direction intersecting the electric wire.

According to the connector of the invention, the cover part capable of causing the terminal accommodation chamber to be open is formed between the terminal fitting opening of the inner housing and the electric wire pullout opening. In the inner housing whose cover part has been opened so that the inner housing has been opened, the terminal fitting opening and the electric wire pullout opening go into fluid communication with each other and the entire face of the terminal accommodation chamber in the fitting direction is widely opened. By virtue of this, the electric wire with terminal can be parallel-displaced in the fitting direction with the counterpart terminal so as to be inserted into the terminal accommodation chamber. As a result, insertion into the narrow terminal holding part which is located on the far side in the terminal insertion direction and hence insertion into which has been difficult in the conventional art can be performed from a proximity position in the fitting direction.

According to the connector of the invention, once the inner housing is inserted into the outer housing, the base end side in which the vicinity of the hinge part in the cover part has a smaller opening amount (flotation amount) first abuts against the electric wire pullout-side end of the stepped part. When the inner housing is inserted further into the outer housing, the insertion tip end receives a reaction force (a biasing force) from the electric wire pullout-side end so that the cover part is moved in the closing direction. A tip imaginary line is curved such that the position of the electric wire pullout-side end gradually goes to the far side as going toward the overlapping part. Thus, as the inner housing is inserted into the outer housing, the cover part is moved stepwise and then, finally, the insertion tip end of the overlapping part is closed by the electric wire pullout-side end. As a result, in the inner housing, the insertion tip end of the cover part is not directly caught by the stepped part and hence smooth insertion into the outer housing is achieved.

According to the connector of the invention, once the inner housing is inserted into the outer housing, the cover part is moved in the closing direction by a reaction force received from the electric wire pullout-side end face of the stepped part. The protrusion provided in the electric wire opposing face of the cover part goes into abutment against the electric wire in association with the movement of the cover part in the closing direction. The cover part is moved in the closing direction by the electric wire pullout-side end face and then finally pressed by the protruding tip of the stepped part so as to be closed. At that time, in the cover part, the reaction force received from the stepped part becomes maximal. The electric wire is pressed by the reaction force received from the protrusion so as to be held reliably within the inner housing.

According to the connector of the invention, in comparison with a case that the stepped part is formed as a thick-wall part, since gaps are formed between the ribs, the outer housing has a smaller contact area with the inner housing at the time of insertion of the inner housing. By virtue of this, the insertion resistance can be suppressed and hence the insertion workability of the inner housing can be improved further. Moreover, the amount of resin material used in the molding of the outer housing can be reduced and hence weight reduction is achieved.

According to the waterproof connector according to the present invention, an attachment workability of the electric wire with terminal can be ensured.

What is claimed is:

1. A connector comprising:
   an electric wire;
   a terminal which is provided at an end of the electric wire;
   an inner housing including a terminal accommodation chamber configured to accommodate the terminal and an electric wire accommodation chamber configured to accommodate the electric wire;
   an outer housing configured to accommodate the inner housing; and
   a cover part connected to the inner housing through a hinge part having a rotation axis extending along an extending direction of the electric wire, wherein
   the cover part is configured to cover only the electric wire accommodation chamber in the inner housing such that the terminal accommodation chamber remains to be open when the cover part is closed.

2. The connector according to claim 1, wherein
   a shape of the terminal accommodation chamber viewed from the terminal fitting direction corresponds to an outer shape of the terminal, and
   the shape of the terminal accommodation chamber is asymmetrical with respect to the extending direction of the electric wire.

3. The connector according to claim 2, wherein
   an engaging wall protrudes from an inner side wall defining the terminal accommodation chamber, so as to define a slit, and
   the engaging wall is configured to come in contact with a corner part of the terminal at the extending direction so as to prevent the electric wire from falling out.

4. The connector according to claim 1, wherein
   the outer housing has an electric wire pullout opening so that the inner housing is inserted through the electric wire pullout opening in the extending direction of the electric wire.

5. The connector according to claim 4, further comprising:
   a stepped part protruding from an inner wall of the outer housing, wherein
   a protruding tip of the stepped part is configured to support the inner housing,
   an end face of the stepped part at a side of the electric wire pullout opening in the extending direction is configured to come in contact with an end face of the cover part in the extending direction when the inner housing is inserted into the outer housing, and
   a tip imaginary line of the end face of the stepped part is curved so that a position corresponding to an edge of the cover part opposite to the hinge part is located on a far side in an inner housing insertion direction in which the inner housing is inserted into the outer housing in the extending direction.

6. The connector according to claim 5, wherein
   the stepped part includes a plurality of ribs extending in the inner housing insertion direction and provided in parallel to each other with intervals therebetween in an inner peripheral direction of the outer housing.

7. The connector according to claim 1, wherein
   a protrusion configured to press the electric wire is provided in the cover part.

8. The connector according to claim 1, wherein
   the outer housing has an electric wire pullout opening so that the inner housing is inserted through the electric wire pullout opening in the extending direction of the electric wire, and
   a sealing member is provided between the electric wire pullout opening and the electric wire.

9. A connector comprising:
   an electric wire including a terminal which is provided at an end of the electric wire;
   an inner housing including a terminal accommodation chamber configured to accommodate the electric wire with the terminal;
   an outer housing configured to accommodate the inner housing;
   a cover part; and
   a stepped part protruding from an inner wall of the outer housing, wherein
   the inner housing has an opening which opens in a terminal fitting direction intersecting with an extending direction of the electric wire so that the electric wire and the terminal are inserted into the terminal accommodation chamber through the opening, and
   the cover part is configured to cover a part of the opening,
   wherein the outer housing has an electric wire pullout opening so that the inner housing is inserted through the electric wire pullout opening in the extending direction of the electric wire,
   the cover part is connected to the inner housing by a hinge part, and
   the hinge part extends in the extending direction,
   a protruding tip of the stepped part is configured to support the inner housing,
   an end face of the stepped part at a side of the electric wire pullout opening in the extending direction is configured to come in contact with an end face of the cover part in the extending direction when the inner housing is inserted into the outer housing, and
   a tip imaginary line of the end face of the stepped part is curved so that a position corresponding to an edge of the cover part opposite to the hinge part is located on a far side in an inner housing insertion direction in which the inner housing is inserted into the outer housing in the extending direction.

10. The connector according to claim 9, wherein
    the stepped part includes a plurality of ribs extending in the inner housing insertion direction and provided in parallel to each other with intervals therebetween in an inner peripheral direction of the outer housing.

* * * * *